United States Patent [19]
Everett

[11] 3,971,620

[45] July 27, 1976

[54] TELESCOPE ASSEMBLIES

[75] Inventor: George Everett, Burlington, Unionville, Conn.

[73] Assignee: Gros-ite Industries, Inc., Farmington, Conn.

[22] Filed: May 16, 1974

[21] Appl. No.: 470,515

[52] U.S. Cl. .................................. 350/26; 350/83; 350/85
[51] Int. Cl.² .................. G02B 23/02; G02B 21/24
[58] Field of Search .................. 350/83, 82, 8.5, 22, 350/24, 25, 26, 48, 84; 250/203 R

[56] References Cited
UNITED STATES PATENTS

| | | | |
|---|---|---|---|
| 448,081 | 3/1891 | Saegmuller | 350/83 |
| 1,468,973 | 9/1923 | Porter | 350/83 |
| 2,505,819 | 5/1950 | Wrigley | 350/26 |
| 2,693,032 | 11/1954 | Braymer | 350/82 |
| 2,766,387 | 10/1956 | Bolsey | 250/203 R |
| 2,792,741 | 5/1957 | Mazzon | 350/26 |
| 3,006,244 | 10/1961 | Farrington | 350/82 |
| 3,015,249 | 1/1942 | Taylor | 350/24 |
| 3,229,101 | 1/1966 | Chitayat | 250/203 R |
| 3,578,975 | 5/1971 | Wheeler | 250/203 R |

Primary Examiner—John K. Corbin
Assistant Examiner—Jon W. Henry
Attorney, Agent, or Firm—Shapiro and Shapiro

[57] ABSTRACT

In an astronomical telescope assembly which can be used in a non-observatory type building, a refracting telescope is mounted for rotation about its optical axis with the optical axis parallel to the axis of earth's rotation and with the eyepiece end of the telescope higher than the objective end, which extends to the outside of the building through an opening in a wall of the building. A reflector unit carried by the objective end of the telescope has a reflecting surface which is pivotable about an axis perpendicular to the optical axis for directing light into the telescope, the reflecting surface being manually positionable about its axis by control means provided at the eyepiece end of the telescope. The telescope proper may be of known construction or may employ spars upon which various optical elements can be releasably mounted for forming different optical systems. Automatic solar tracking apparatus is provided.

5 Claims, 13 Drawing Figures

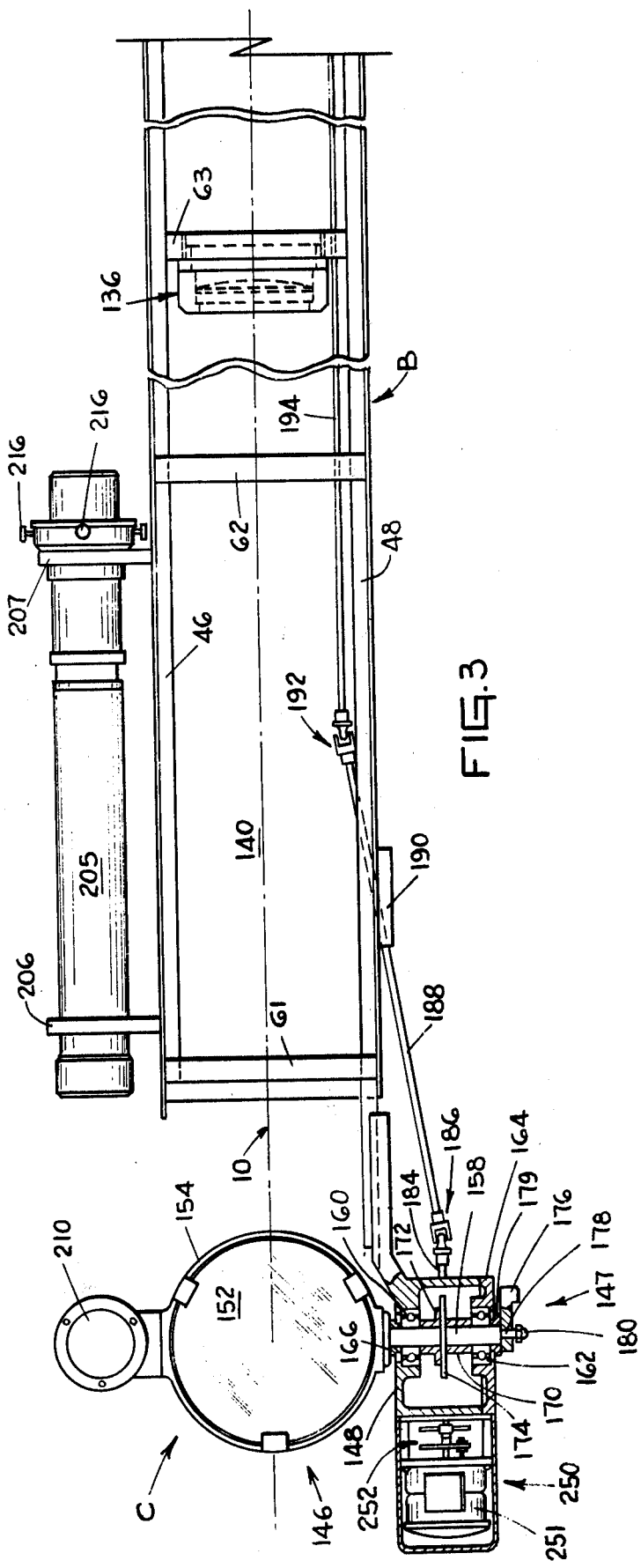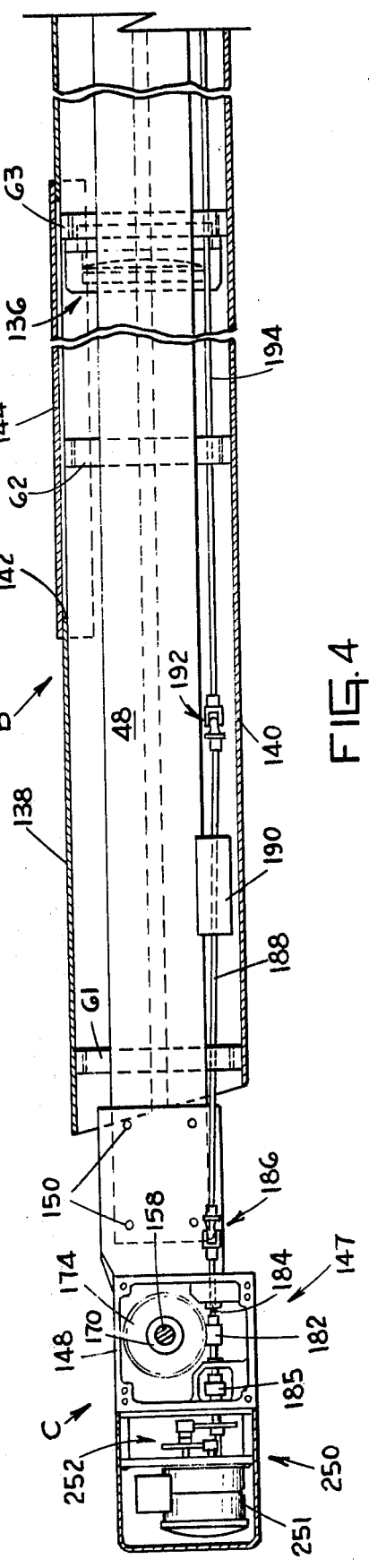

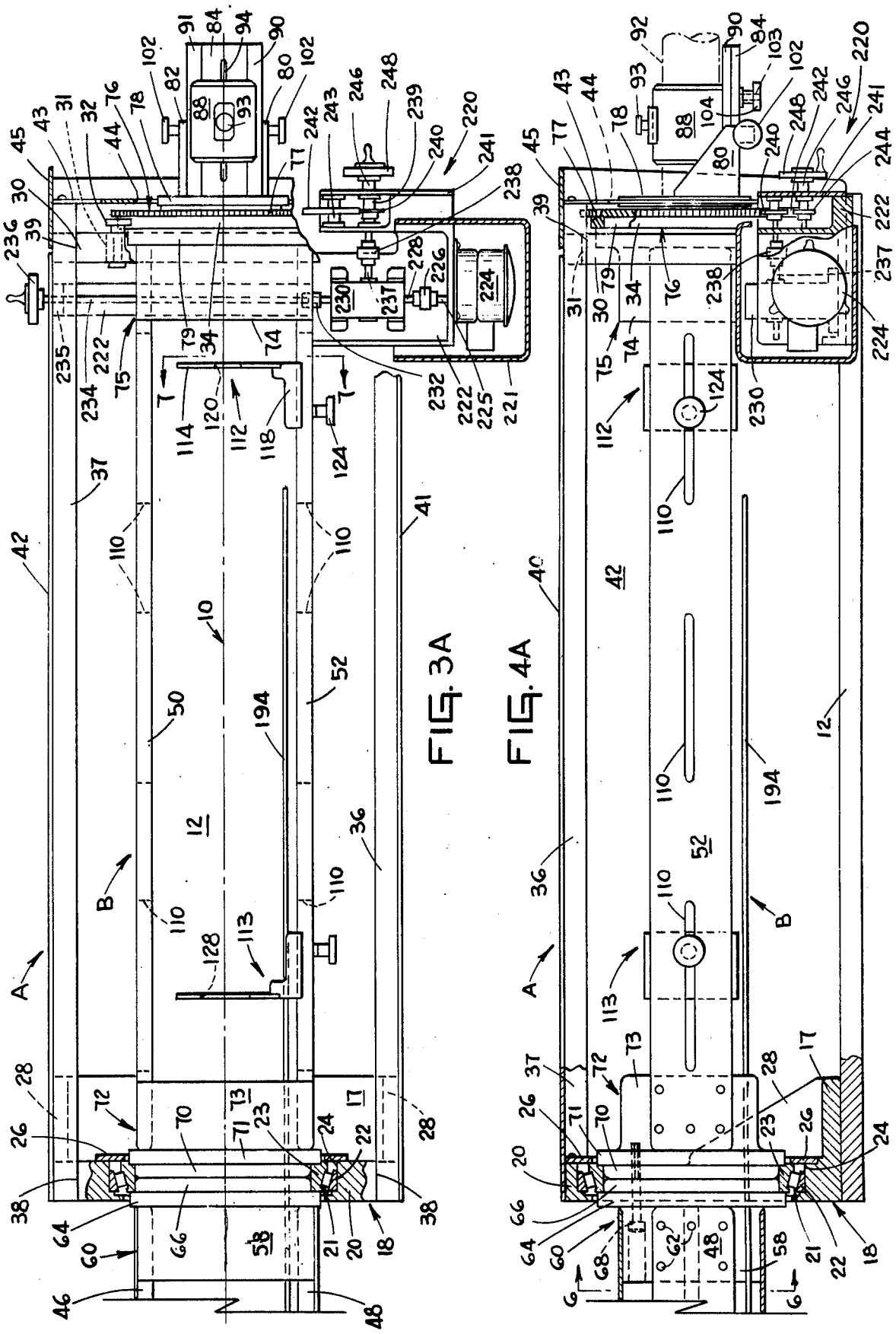

TELESCOPE ASSEMBLIES

This invention relates generally to astronomical telescopes, and is more particularly directed to improved refracting astronomical telescope assemblies.

BACKGROUND OF THE INVENTION

Equatorially mounted astronomical telescopes of the type in general use in observatories have several disadvantages. Firstly, because equatorial mountings permit the telescope to be pivoted about two mutually perpendicular axes, it is necessary that the roof of the observatory building be specially constructed to enable the telescope to be directed at various points in the sky. Typically, the roof is a rotatable, slotted dome supported by massive bearings and requiring a powerful motor drive system for its operation. Secondly, because the interior of the observatory building is open to the outside through the roof, the motor drive system and bearings for tracking are unprotected from the weather. Thirdly, telescope mountings of this type do not provide the rigidity required for certain types of observations, such as viewing the corona of the sun through a telescope of the type which artificially eclipses an image of the sun. Fourthly, in spite of the high cost of construction, observatories of this type do not provide comfortable viewing. The interior of the observatory building can neither be suitably heated nor cooled relative to the outside temperature because the resulting passage of air through openings in the roof affects viewing quality. Moreover, because the telescope proper must be moved to different positions to enable observation of different points in the sky, the eyepiece end of the telescope may assume positions in which the posture of the observer is awkward and fatiguing.

SUMMARY OF THE INVENTION

Accordingly, a primary object of the invention is to provide an improved astronomical telescope assembly which can be used in buildings which are comparatively inexpensive in that observatory-type construction is not required.

Another object of the invention is to provide a telescope assembly which enables comfortable viewing by permitting the inside of the building which houses the telescope assembly to be maintained at a comfortable temperature.

Another object of the invention is to provide a telescope assembly of the above-described type wherein the eyepiece of the telescope remains at a fixed position comfortable for an observer, the only movement of the eyepiece being rotation about its optical axis.

Another object of the invention is to provide a telescope assembly of the above-described type having a bearing construction which provides exceptional rigidity.

Another object of the invention is to provide a telescope assembly of the above-described type which can automatically track the sun.

Another object of the invention is to provide a telescope assembly of the above-described type employing a telescope of improved construction which permits various optical elements to be releasably mounted in the telescope for providing different optical systems.

Another object of the invention is to provide an improved telescope assembly of the above-described type which may employ a refracting telescope of known construction.

An astronomical telescope assembly in accordance with the invention can be used in an ordinary or non-observatory type building and employs a refracting telescope mounted for rotation about its optical axis with the optical axis parallel to the axis of the earth's rotation and with the eyepiece end of the telescope higher than the objective end. The objective end of the telescope is adapted to be inserted through an opening in a vertical wall of the building for positioning outside the building. A reflector unit mounted at the objective end of the telescope and rotatable with the telescope has a reflecting surface which is pivotable about an axis perpendicular to the optical axis for directing light into the telescope, the reflecting surface being remotely positionable about its axis by means provided at the eyepiece end of the telescope, thereby enabling the position of the reflecting surface to be controlled from inside the building. The telescope may be constructed of a plurality of spars to which various optical elements may be releasably attached for forming different optical systems.

The above-described objects and advantages of the invention and other advantages and improved results will be apparent from the following detailed description of the invention.

BRIEF DESCRIPTION OF THE DRAWINGS

FIGS. 3 and 3A together provide a plan view of the telescope assembly of FIG. 1 with certain of the parts omitted for clarity in illustration, and with other parts broken away and in cross section;

FIGS. 4 and 4A together provide a side elevational view of the telescope assembly of FIG. 1 with certain of the parts omitted for clarity in illustration, and with other parts broken away and in cross section;

DETAILED DESCRIPTION OF THE PREFERRED EMBODIMENTS

Figure 1:
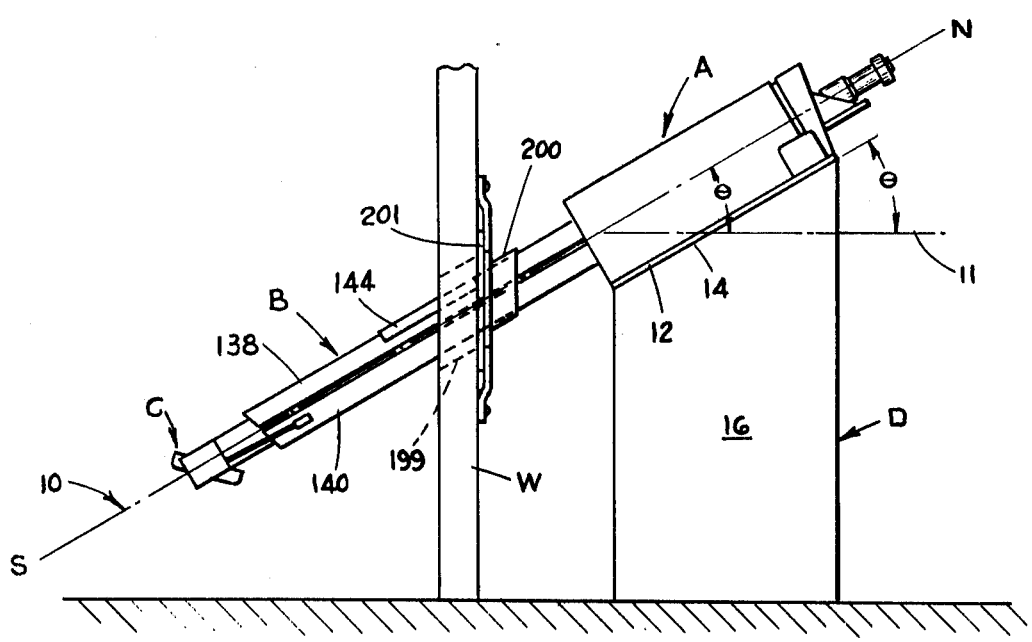
FIG. 1 is a side elevational view of a telescope assembly in accordance with the invention, this view showing the telescope assembly mounted on a base with the objective end of the telescope inserted through an opening in a vertical wall and showing a weather seal.

Referring to the drawings, a telescope assembly in accordance with the invention essentially comprises a frame A, a refracting astronomical telescope B, a reflector unit C, and a base D.

Referring to FIG. 1, frame A supports telescope B for rotation about its optical axis 10, the frame being mounted on base D in a position wherein the optical axis of the telescope is parallel to the axis of the earth's rotation with the eyepiece end of the telescope being higher than the objective end (i.e., the objective end of the telescope points to the south celestial pole S when the telescope assembly of the invention is located in the Northern Hemisphere, and to the north celestial pole N for locations in the Southern Hemisphere). The angle $\theta$ between the optical axis of the telescope thus aligned and the horizon 11 corresponds to the latitude of the site of the telescope assembly. Moreover, as will be more apparent hereinafter, frame A supports the telescope with its optical axis parallel to the bottom surface of the rectangular base plate 12 of the frame so that the surface on base D to which frame A is attached (shown in FIG. 1 as surface 14 of a cement pier 16) is inclined relative to the horizon at the same angle $\theta$.

Support frame A will now be described in detail with reference to FIGS. 3A and 4A. The rectangular leg portion 17 of an L-shaped plate 18 is attached to the end of base plate 12 which is nearest the objective end of the telescope (the end of the telescope to which reflector unit C is attached), the other leg portion of plate 18 forming a rectangular end wall 20 perpendicular to the base plate. A roller bearing 21 is mounted in a circular opening 24 in the end wall, the outer race 22 of the bearing being press-fitted into position in the opening and the inner race 23 of the bearing being attached to telescope B in a manner to be described in detail later. A bearing plate 26 is suitably attached to end wall 20 for securing the bearing in opening 24. Plate 18 is provided with reinforcements 28 perpendicular to leg portion 17 and end wall 20 for increasing the rigidity of the plate. A rectangular support plate is attached to base plate 12 near its other end for forming another end wall 30 which is also perpendicular to the base plate. This end wall has a large circular opening 31 therethrough and carries three bearings 32 (see FIG. 5) which are equally spaced about the periphery of the opening, the bearings being cooperable with a cylindrical bearing surface 34 on telescope B for rotatably supporting the eyepiece end of the telescope. A pair of spaced, elongated support rails 36 and 37 of square cross section have their ends secured in notches 38 and 39 at the corners of end walls 20 and 30, respectively. A rectangular top panel 40 (removed in FIG. 3A) and rectangular side panels 41 (removed in FIG. 4A) and 42 are provided for enclosing the portion of the telescope between end walls 20 and 30, these panels having their edges suitably attached to appropriate ones of support rails 36 and 37, base plate 12, and end walls 20 and 30.

Figure 5:
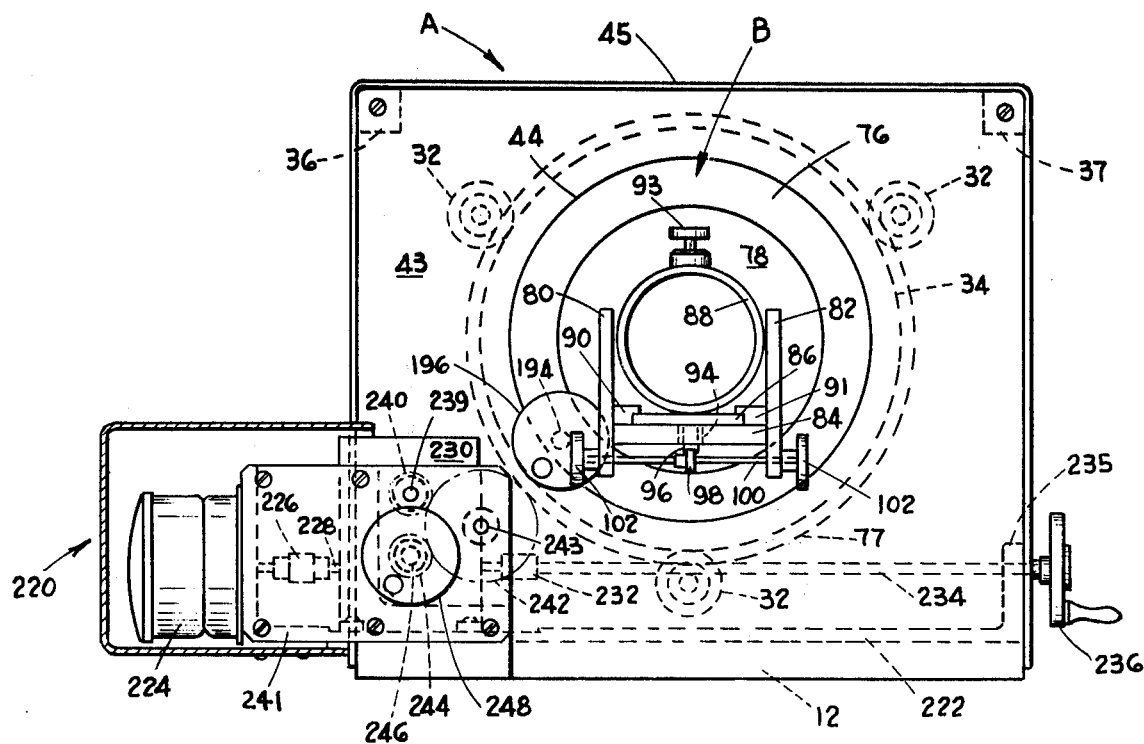
FIG. 5 is an end elevational view of the eyepiece end of the telescope assembly.

As shown in FIG. 5, a generally rectangular end cover 43 having a central opening 44 therethrough is attached by screws to the ends of the support rails 36 and 37 and to the end of base plate 12. A U-shaped end cap 45 is suitably attached to end wall 30 for enclosing the space between end wall 30 and end cover 43, the cap extending slightly beyond the end cover to form a hood.

In the preferred embodiment of the invention, telescope B employs elongated, flat spars of rectangular cross section to which various optical elements may be releasably attached (with their optical axes aligned on the axis of rotation of the telescope) for enabling easy formation of different optical systems in the telescope.

Figure 6:
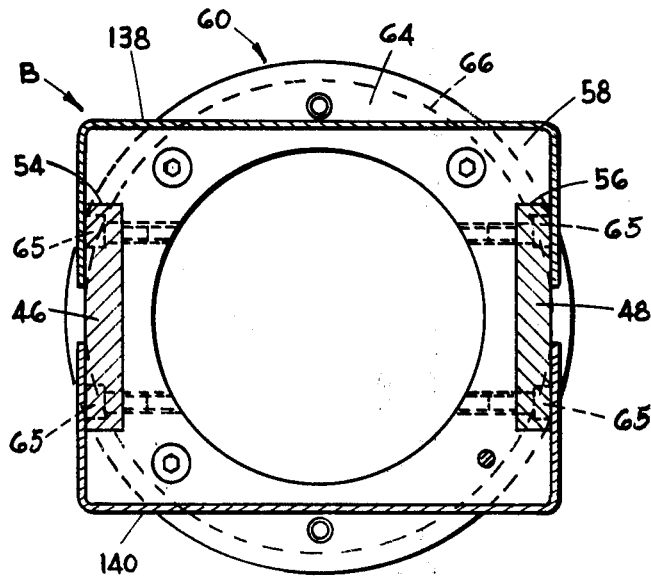
FIG. 6 is a transverse sectional view taken approximately in the plane of line 6—6 of FIG. 4A.

Referring to FIGS. 3, 3A, 4 and 4A, a first pair of spars 46 and 48 are attached to opposite sides of the rectangular end portion 58 of a mounting block 60 and to opposite sides of a plurality of rectangular lens holders 61, 62 and 63 (described in detail later) for support in spaced, parallel relation on opposite sides of the axis of rotation of the telescope. As shown in FIG. 6, the ends of spars 46 and 48 nearest the eyepiece end of the telescope are secured in recesses 54 and 56 in rectangular end portion 58 of mounting block 60 by screws 65. The cylindrical other end portion 64 of the mounting block has a reduced-diameter portion 66 which is received by one side of inner race 23 of roller bearing 21, as shown in FIGS. 3A and 4A. The other side of the inner race receives the reduced-diameter portion 70 of the cylindrical end portion 71 of another mounting block 72 which is similar to mounting block 60, the two mounting blocks being connected together by screws 68 (only one screw being shown) for clamping the inner race between the mounting blocks.

A second pair of spars 50 and 52 have their ends which are nearest the objective end of the telescope attached to the rectangular end portion 73 of mounting block 72 in the same manner that spars 46 and 48 are attached to mounting block 60. The other ends of those spars are attached to the rectangular end portion 74 of a third mounting block 75 which is similar in construction to mounting blocks 60 and 72. Spars 50 and 52 are thereby supported in spaced, parallel relation on opposite sides of the axis of rotation of the telescope, the spars 50 and 52 being in substantially end-to-end relation with spars 46 and 48, respectively. Mounted on the cylindrical end portion 79 of support block 75 by screws (not shown) is a drive gear 76 having a smooth cylindrical bearing surface 34 which is cooperable with bearings 32 carried by end wall 30 of frame A, the drive gear also having peripheral teeth 77 which are cooperable with a telescope drive assembly (described in detail later) for positioning the telescope about its optical axis.

The focusing apparatus of the telescope will now be described with reference to FIGS. 3A, 4A and 5. A circular plate 78 mounted coaxially on drive gear 76 by screws (not shown) has a pair of spaced, parallel side plates 80 and 82 mounted perpendicularly thereon which support a slide plate 84 therebetween perpendicularly relative to plate 78 and side plates 80 and 82, as shown in FIG. 5. A focusing slide 86 carrying a cylindrical draw tube support 88 is maintained in sliding contact with the top surface of slide plate 84 by guide rails 90 and 91 which are suitably attached to the top of the slide plate adjacent side plates 80 and 82, respectively. A draw tube 92 (shown in phantom in FIG. 4A) may be secured in draw tube support 88 by a thumbscrew 93, the draw tube being dimensioned to receive a conventional eyepiece.

Referring to FIG. 5, extending from slide 86 through a slit 94 in slide plate 84 is an axially elongated projection 96 having teeth in engagement with the toothed periphery of a gear wheel 98 which is fixed to a shaft 100 rotatably supported by side plates 80 and 82, the projection and the gear wheel cooperating to form rack-and-pinion type gearing. Knobs 102 are fixed at both ends of the shaft for enabling the shaft and the gear wheel to be manually rotated for moving the slide 86 and draw tube 88 relative to the slide plate 84 to effect focusing. Referring to FIG. 4A, a threaded stud 103 may project from the slide through slit 94 in slide plate 84 for carrying at its end a thumb nut 104 which may be tightened to secure the slide in the desired position.

Figure 7:
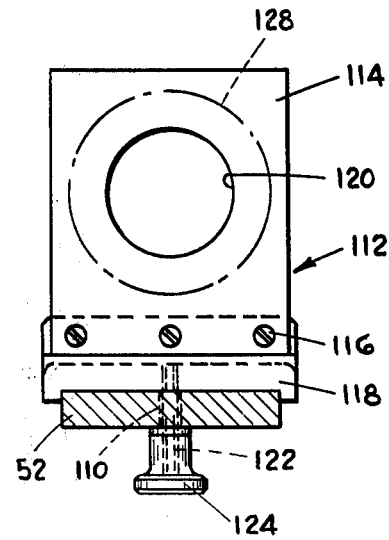
FIG. 7 is a partial transverse sectional view taken approximately in the plane of line 7—7 of FIG. 3A.

As pointed out above, the spar construction of telescope B enables various optical elements to be releasably mounted in the telescope for forming different optical systems. Referring to FIGS. 3A and 4A, each of spars 50 and 52 is provided with longitudinal slits 110 for enabling various optical elements, such as baffle assemblies 112 and 113, to be slidably positionable on those spars. As shown in FIG. 7, baffle assembly 112 comprises a baffle plate 114 attached by screws 116 to a baffle plate holder 118, the plate having an aperture 120 therein. The threaded end of a stud 122, which extends perpendicularly from the baffle holder through slit 110 in spar 52, carries a knurled thumb nut 124 which can be tightened on the stud for securing the baffle assembly to the spar in the desired position. Baffle assembly 113 is similar in construction to baffle assembly 112, the relative size of its aperture 128 being indicated in phantom in FIG. 7.

Referring to FIGS. 3 and 4, lens holders 61, 62 and 63, which are suitably attached to spars 46 and 48, have configurations generally similar in cross section to that of rectangular end portion 58 of support block 60, shown in FIG. 6. Each of the lens holders is adapted to support various optical elements which cooperate with the elements attached to spars 50 and 52 and with the eyepiece (not shown) for forming the optical system of the telescope. For example, as shown in FIGS. 3 and 4, lens holder 63 may support an achromatic objective lens assembly 136 which is cooperable with baffle assemblies 112 and 113 and with the eyepiece (not shown) for providing an optical system for viewing the moon, planets, or other celestial bodies on the ecliptic. The objective lens assembly forms an image at its focal plane, the positions of the baffles being adjusted so that they intersect the cone of light from the objective lens assembly at positions which give the best background. The eyepiece of the telescope is then adjusted for viewing the image formed at the focal plane of the objective lens.

As shown in FIG. 4, top and bottom optics covers 138 and 140, respectively, which are U-shaped in cross section, have their longitudinal edges attached to spars 46 and 48 by screws (not shown) for enclosing the space between those spars. A rectangular opening 142 in the top surface of top cover 138 provides access to lens holders 62 and 63, the opening normally being closed by an access cover 144 of U-shaped cross section fitted to the top cover.

Referring to FIGS. 3 and 4, mounted at the objective end of telescope B and rotatable with the telescope is a reflector unit C comprising a mirror assembly 146 and a mirror drive assembly 147, the gear box housing 148 of the mirror drive assembly being attached to the extended end of spar 48 by screws 150, as shown in FIG. 4. Mirror assembly 146 has a circular, planar reflecting surface 152, preferably a mirror, which intersects the axis of rotation of the telescope (i.e., the optical axis of the telescope) for directing light into the objective end of the telescope. The mirror is carried by a mirror holder 154 mounted at one end of a mirror drive shaft 158, which is pivotable about an axis perpendicular to the optical axis for enabling the angle of intersection of the reflecting surface of the mirror with the optical axis to be changed. The end of the mirror drive shaft which carries the mirror holder is supported by a roller bearing 160 in the gear box housing 148 and the other end of the drive shaft is supported by another roller bearing 162 in gear box housing cover 164. For enabling precise positioning of the mirror about its axis, it is preferred that the reflecting surface of the mirror intersect the optical axis of the telescope at the same point throughout the entire range of selectable positions of the mirror assembly (i.e., the axis of pivoting of the reflecting surface lies in the plane of the reflecting surface and intersects the optical axis of the telescope). As shown in FIG. 3, mirror holder 154 is spaced from bearing 160 by a spacer 166.

In accordance with an important aspect of the invention, mirror drive assembly 147 is constructed so that the position of mirror assembly 146 may be controlled from the eyepiece end of the telescope. Referring to FIG. 3, the portion of the mirror drive shaft 158 between bearings 160 and 162 is received by a cylindrical sleeve 170 having an annular flange 172 extending perpendicularly therefrom to which a worm wheel 174 is suitably attached. A threaded locking lever 176 is carried by a threaded stud 178 which extends axially from the end of mirror drive shaft 158, the locking lever being spaced from bearing 162 by a spacer 179. A threaded cap nut 180 engages the end of the stud. With this construction, rotating the locking lever in the clockwise direction to tighten the lever on stud 178 causes sleeve 170 to be clamped between mirror holder 154 and the locking lever, thereby fixing the position of worm wheel 174 relative to mirror drive shaft 158. Conversely, rotating the locking lever counterclockwise unclamps sleeve 170 so that the sleeve and the worm wheel 174 may be rotated relative to mirror drive shaft 158. Referring to FIG. 4, in which gear box cover 164 is removed, a worm 182 cooperable with worm wheel 174 is fixed on a shaft 184 which is rotatably supported by gear box housing 148. A friction clutch 185 couples one end of the shaft to a motor drive assembly which is described in detail later. The other end of the shaft is coupled by a universal joint 186 to one end of a control rod 188 which is disposed at an angle relative to shaft 184, as shown in FIG. 3.

Control rod 188 extends through a rod guide 190 and through optics cover 140 into the interior of telescope B, where the other end of the control rod is coupled by a second universal joint 192 to one end of a second control rod 194. Control rod 194 is supported parallel to the optical axis of the telescope by aligned circular openings in lens holders 62 and 63, in mounting blocks 60, 72 and 75, and in drive gear 76, the rod extending (see FIG. 5) through opening 44 in cover plate 43 of frame A and terminating short of focus control knob 102 at the objective end of the telescope. As shown in FIG. 5, a manually operable precision crank 196 is attached to the end of the control rod for enabling mirror 152 to be remotely positioned about its axis from the eyepiece end of the telescope by rotating the crank.

When the telescope assembly of the invention is mounted in the position shown in FIG. 1, wherein the optical axis of telescope B is parallel to the axis N-S of the earth's rotation, rotating the telescope about its optical axis causes the telescope to scan the sky along the right ascension axis, and pivoting the mirror 152 about its axis of rotation causes the telescope to scan the sky along the declination axis. Because the only motion of the telescope is rotation about its optical axis, the telescope assembly of the present invention does not require a costly observatory type building, but rather can be installed in any building of sufficient size having a wall W (FIG. 1) which generally faces the appropriate celestial pole (i.e., the wall should generally face the south celestial pole for a telescope installation in accordance with the invention located in the Northern Hemisphere and the north celestial pole for an installation in the Southern Hemisphere). The only necessary modification of the building is the provision of an opening 199 (FIG. 2) in the wall through which the objective end of the telescope can be inserted. When the telescope assembly of the invention is mounted on a suitable base, such as the cement pier 16 of FIG. 1, a telescope assembly is provided which requires far less space than conventionally mounted telescopes.

Figure 2:
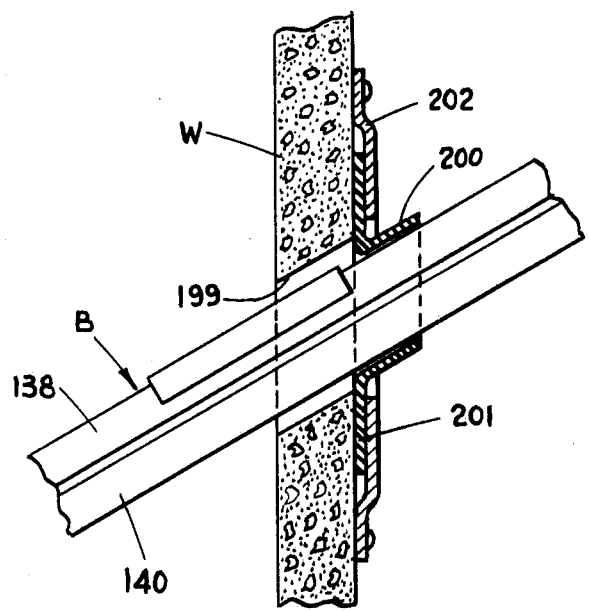
FIG. 2 is a partial vertical sectional view through the wall of FIG. 1, this view showing the weather seal in cross section.

As shown best in FIG. 2, for forming a weatherproof seal at the point where the telescope passes through the wall, the telescope may carry a sleeve 200 formed of a flexible waterproof material, such as rubber or the like, having a flanged portion 201 which is held against the interior surface of the wall by an annular support plate 202 fixed to the wall. The massive bearing design of the telescope assembly, which provides the high degree of rigidity required for certain types of observations, such as viewing the corona of the sun through an optical system which artificially eclipses an image of the sun, is thus protected from the weather.

The telescope assembly of the present invention provides viewing more comfortable than that possible with conventionally mounted telescopes for several reasons. Firstly, the problems associated with air passing through openings in the roof of the building are entirely avoided, thereby permitting the interior of the building to be maintained at a comfortable temperature. Secondly, because the only motion of the telescope is rotation about its optical axis with the eyepiece end of the telescope being higher than the objective end, the eyepiece end of the telescope is always in a position comfortable for an observer.

The fact that the level of the eyepiece does not change also enables easier balancing of associated equipment, such as cameras and photometers, and makes practical coin-operated use. For time-lapse photography when the telescope is automatically tracking a celestial body, such as the sun (in a manner described hereinafter), it is desired that the camera be mounted at the eyepiece end of the telescope for rotation with the telescope so that the image does not rotate relative to the camera film.

A motorized tracking system is provided for automatically tracking the sun as the earth rotates about its axis. Referring to FIG. 3, a tracker telescope 205 is mounted at the objective end of the telescope (with its optical axis parallel to the optical axis of the telescope B) by front and rear supports 206 and 207 which are suitably attached to spar 46. Mirror assembly 146 of reflector unit C is provided with an additional reflecting surface or mirror 210 co-planar with mirror 152 for enabling the tracker telescope optics 211 (see FIG. 8) to form an image 212 of the sun in a focal plane. Four photocells 214 are positioned in the focal plane of the tracker telescope, as shown in FIG. 8, two of the photocells being positioned on the right ascension axis, while the other two photocells are positioned on the declination axis, the position of the photocells on their respective axes being adjustable by photocell control screws 216, shown in FIG. 3.

Figure 8:
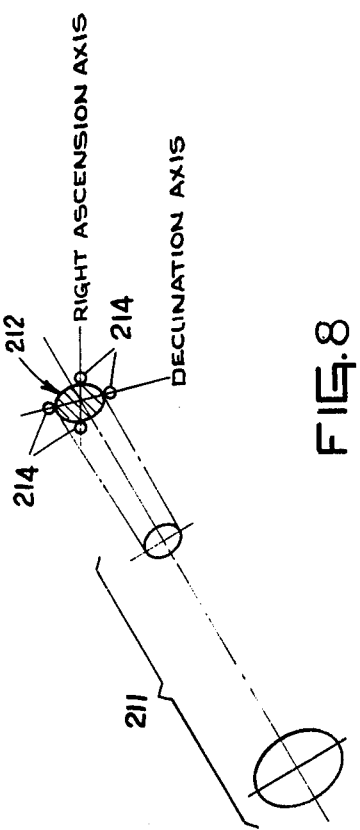
FIG. 8 is a diagrammatic view of the optical system of a tracker telescope which may be employed in the telescope assembly of the invention.

When the mirror assembly 146 and the telescope B are positioned such that an image of the sun is formed at the desired location in the focal plane of the telescope B, photocells 214 are adjusted on their axes to be adjacent the periphery of the image of the sun formed at the focal plane of the tracker telescope, as shown in FIG. 8. Accordingly, if the sun's image shifts from that position, certain of the photocells will produce signals representing the direction of the shift. These signals are processed in a known manner and applied to motor drive systems (described hereinafter) which automatically position the telescope B and the mirror assembly 146 to maintain the image of the sun formed by the tracker telescope in the position shown in FIG. 8, thereby maintaining the image of the sun formed by the telescope B in a fixed position. It is necessary to automatically track along the declination axis as well as the right ascension axis because of the effect of refraction of the sun's rays by the earth's atmosphere.

Referring to FIG. 3A, a motor drive assembly 220 is mounted at the eyepiece end of support frame A for rotating the telescope in response to signals generated by the two photocells which lie on the right ascension axis, the assembly being partly enclosed by a housing 221 which is shown cut away. The assembly comprises an elongated support member 222 mounted on base plate 12 of support frame A and to which is attached a motor 224 having its output shaft 225 connected through a friction clutch 226 to the worm shaft 228 of a worm and wheel assembly 230. The other end of the worm shaft is connected by a coupling 232 to one end of a shaft 234 which is rotatably supported near its other end by a projection 235 of support member 222. The end of the shaft, which extends through an opening in cover plate 42 of support frame A to the outside of the support frame, has attached thereto a precision hand crank 236. The wheel shaft 237 of worm and wheel assembly 230 is coupled through another friction clutch 238 to one end of a shaft 239 to which is fixed a spur gear 240, the shaft having its ends rotatably supported by the support member 222 and a bearing support plate 241 attached to the support member. A larger diameter spur gear 242 is mounted on a rotatable shaft 243 for engagement with spur gear 240 and teeth 77 on drive gear 76 of telescope B (FIG. 5). Another spur gear 244 (FIG. 4A) is mounted on another rotatable shaft 246 for engaging spur gear 242, the end of the shaft extending through the bearing support plate 241 and having a precision hand crank 248 mounted thereon.

When energized in response to signals generated by the photocells which lie on the right ascension axis (FIG. 8), motor 224 transmits torque through friction clutch 226, worm and wheel assembly 230, friction clutch 238, spur gear 240 and spur gear 242 to rotate the telescope at the solar rate of 15° per hour (one revolution in 24 hours). However, the friction clutches permit the motor drive to be overridden by manipulation of hand cranks 236 and 248. Clutch 226 slips when hand crank 236 is turned for enabling manual adjustment of the worm shaft 234 in the worm and wheel assembly 230 for providing fine adjustment of the angular position of the telescope, and clutch 238 slips when hand crank 248 is turned for enabling spur gear 244 to act through spur gear 242 to provide a coarse adjustment of the telescope's position.

Referring to FIG. 4, reflector unit C is provided with a motor drive assembly 250 for controlling the angular position of mirror assembly 146 in response to signals generated by the photocells which lie on the declination axis, as shown in FIG. 8, the assembly comprising a motor 251 having its output shaft coupled through a gear reducer 252 to one side of friction clutch 185. The other side of the clutch is connected to worm shaft 184, which carries worm 182 which is cooperable with wheel 174 to rotate the mirror assembly 146 in the manner described hereinabove. When motor 251 is energized in response to signals generated by the photocells, the mirror assembly is rotated at a very slow rate (e.g., 10 arc seconds/second) for tracking along the declination axis. Friction clutch 185 slips to enable the motor drive system to be overridden when crank 196 (FIG. 5) is manually rotated to adjust the angular position of the mirror assembly.

Figure 10:
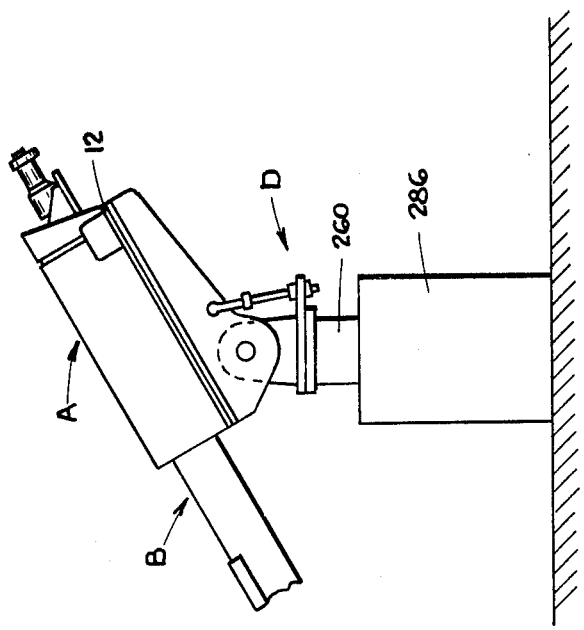
FIGS. 9 and 10 show alternative bases which may be employed with the telescope assembly of the invention.
Figure 9:
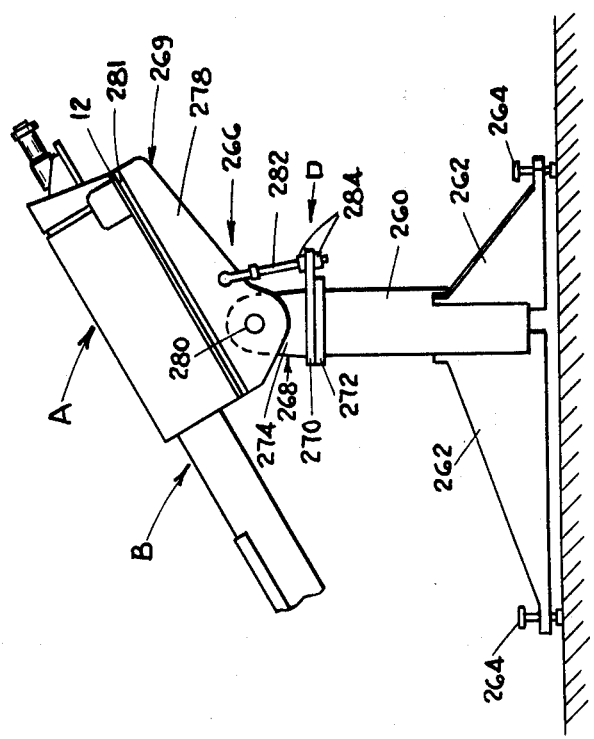

FIGS. 9 and 10 show alternative bases D upon which support frame A may be mounted. FIG. 9 illustrates a portable stand which employs a vertical post 260 having three legs 262 fixed thereto 120° apart at the bottom (only two legs being shown), each leg having an adjustable leveling pad 264 at its end for enabling adjustment of the position of the post. An adjustable support head assembly 266 for mounting support frame A to the top of post 260 at the desired angle comprises a support head 268 to which is pivotally attached a support member 269. The support head has a rectangular base plate 270 secured by bolts (not shown) to a rectangular flange 272 at the top of post 260 and has a vertical wall portion 274. Support member 269 is T-shaped in cross section with the vertical wall portion 278 pivotally attached to wall 274 of the support head by a pivot pin 280, thereby enabling support frame A, which is suitably attached to the top wall portion 281 of the support member, to be rotated about an axis perpendicular to the longitudinal axis of post 260. An adjustable rod 282 is provided for maintaining the support member in the desired position. One end of the rod is pivotally attached to the wall 278 of the support member for rotation about an axis parallel to the axis of pivot pin 280. The threaded other end of the rod extends through an opening in base plate 270 of the support head and carries nuts 284 which may be tightened against the top and bottom surfaces of the base plate to hold the support member 269 in the angular position in which the optical axis of the telescope at the desired angle relative to the horizon.

The mounting assembly of FIG. 10 is similar to the assembly of FIG. 9 but with the vertical support post 260 embedded in a cement pier 286.

Figure 11:
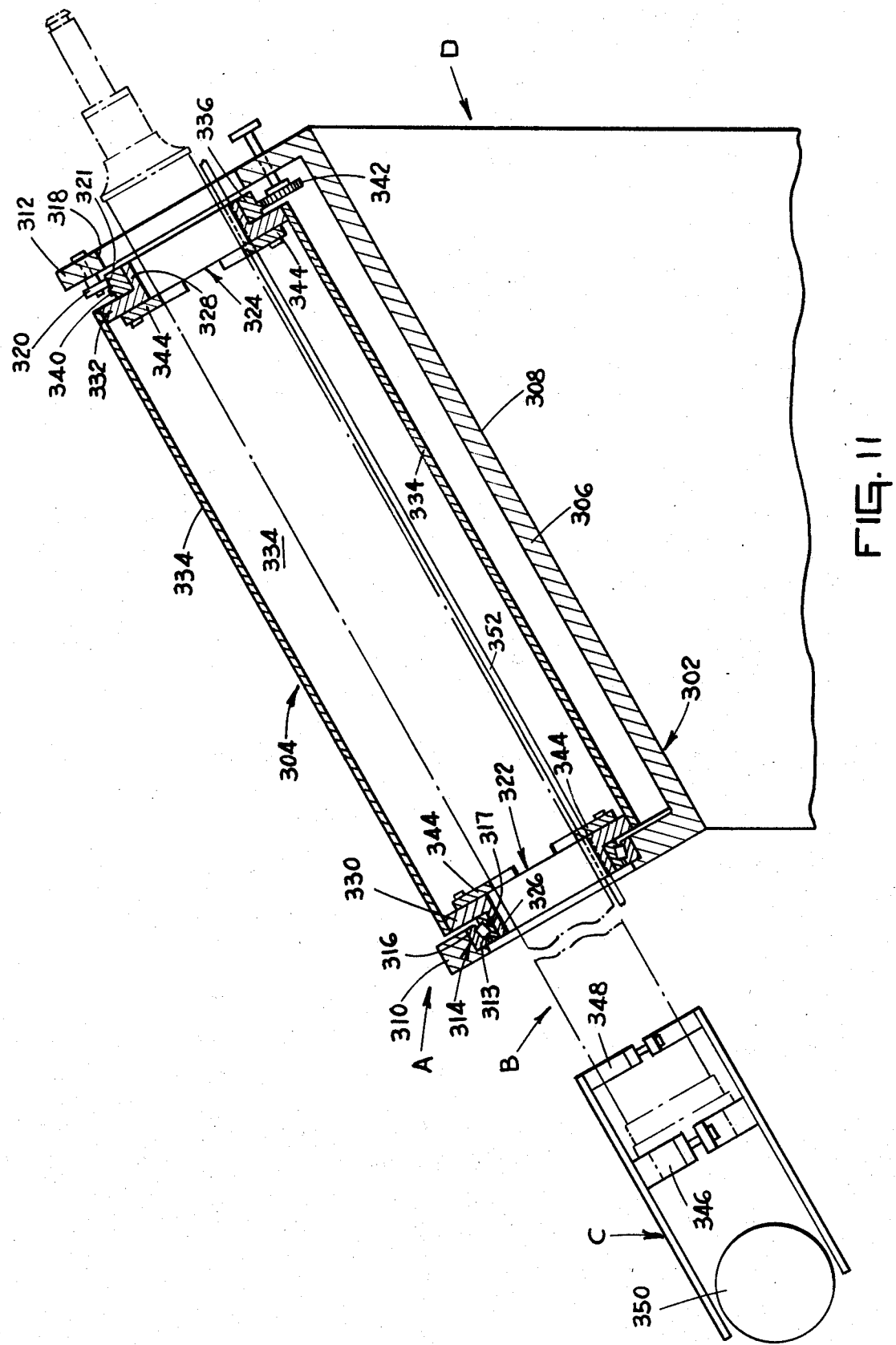
FIG. 11 is a side elevational view, partly in cross section, of apparatus in accordance with the invention which may be used to support a refracting telescope (shown in phantom) of known construction.

FIG. 11 shows a support frame A and a reflector unit C in accordance with the invention for use with a refracting telescope B (shown in phantom) of known construction for forming a telescope assembly in accordance with the invention. Support frame A comprises a stationary frame member 302 and a rotating cradle 304 for supporting the telescope B in the frame member for rotation about its optical axis. Stationary frame member 302, which is preferably formed of a single piece of metal, has a planar, rectangular base portion 306 adapted to be mounted on base D in a position wherein the optical axis of the telescope is parallel to the earth's axis with the eyepiece end of the telescope higher than the objective end, and has rectangular end walls 310 and 312 at opposite ends of the base portion and perpendicular thereto. The outer race 313 of a roller bearing 314 is press-fitted into a circular opening 316 in end wall 310, the inner race 317 of the bearing being press-fitted onto the cylindrical end 326 of the cradle for rotatably supporting that end of the cradle. End wall 312 of the support frame is provided with an opening 318 concentric with opening 316 in end wall 310 and has three bearings 320 (only one of which is shown) equally spaced about the periphery of the opening and cooperable with a bearing surface 321 at the other end of the cradle for rotatably supporting that end of the cradle.

Cradle 304 comprises a pair of mounting blocks 322 and 324 similar to mounting blocks 60, 72 and 75 of FIGS. 3A and 4A, the mounting blocks having cylindrical end portions 326 and 328, respectively, and having rectangular end portions 330 and 332, respectively. Corresponding sides of the rectangular end portions are connected to opposite ends of respective rectangular side walls or spars 334, which may be dimensioned to entirely enclose the space between the mounting blocks. The inner race 317 of bearing 314 is press-fitted onto the cylindrical end portion 326 of mounting block 322. Mounted on cylindrical end portion 328 of mounting block 324 is a drive gear 336 having a smooth cylindrical surface 321 cooperable with bearings 320 and having peripheral teeth 340 engaging a spur gear 342, which may be rotated manually or by a motor drive assembly in the manner described above with respect to FIGS. 3, 3A, 4, and 4A, to position the cradle about its longitudinal axis.

Support members 344 are connected to mounting blocks 330 and 332 by screws for enabling the cradle to support telescope B with its optical axis on the axis of rotation of the cradle, the support members being adjustable so that the cradle may accommodate telescopes having tubes of different diameters.

Reflector unit C is similar in construction and operation to reflector unit C described above with respect to FIGS. 3 and 4, but has a pair of clamps 346 and 348 which enable the unit to be clamped to the objective end of the telescope. The angular position of the mirror 350 about its axis of rotation may be adjusted by manual or automatic control apparatus of the type described hereinabove. However, unlike the telescope assembly of FIGS. 3, 3a, 4 and 4A, in which the mirror position control rod 194 is carried in the interior of the telescope proper, mirror position control rod 352 (only partly shown but identical in function to control rod 194) is rotatably supported outside telescope B by axially aligned openings in mounting blocks 330 and 332 of the cradle.

It is believed that the advantages and improved results furnished by the telescope assemblies of the invention and the apparatus for supporting telescopes of known construction will be apparent from the foregoing description of preferred embodiments of the invention. Various changes and modifications may be made without departing from the spirit and scope of the invention as sought to be defined in the following claims.

I claim:

1. Apparatus for use with a refracting astronomical telescope having an eyepiece end, an objective end, and an optical axis for forming an astronomical telescope assembly, the apparatus comprising:

a frame including a cradle for the attachment thereto of a refracting astronomical telescope for rotation about its optical axis only, the frame being adapted for mounting in a position in which said optical axis is parallel to the axis of the earth's rotation, and with the eyepiece end of the telescope higher than the objective end, the frame having first and second end walls spaced apart on a base and substantially perpendicular thereto and carrying first and second bearing means, the opposite ends of the cradle being rotatably supported by said bearing means for enabling the telescope to be rotated about its optical axis;

a reflector unit for attachment to the objective end of the telescope for rotation with the telescope, the reflector unit having a reflecting surface which intersects said optical axis, means for pivoting the reflecting surface about a second axis substantially perpendicular to said optical axis when the reflector unit is attached to the telescope for directing light into the objective end of the telescope; and manually operable reflecting surface control means carried by the frame in a position adjacent the eyepiece end of the telescope for remote positioning of the reflecting surface about said second axis.

2. Apparatus as set forth in claim 1, wherein the manually operable reflecting surface control means comprises a control rod carried by the cradle.

3. Apparatus as set forth in claim 1, wherein the cradle comprises a plurality of elongated spurs having their opposite ends attached to first and second mounting means, respectively, and wherein said first and second bearing means are cooperable with means provided by said first and second mounting means, respectively, for rotatably supporting the cradle.

4. Apparatus as set forth in claim 3, wherein the first bearing means comprise a roller bearing having an outer race mounted in an opening in the end wall of the frame which is adapted to be nearest the objective end of the telescope and having an inner race attached to the first mounting means of the cradle, and wherein the second bearing means comprises a plurality of additional bearings spaced about a second opening in the other end wall of the frame and cooperable with a bearing surface provided by the second mounting means of the cradle.

5. Apparatus as set forth in claim 3 wherein the frame further comprises means cooperable with gear teeth provided by the second mounting means of the cradle for rotating the cradle.

* * * * *

UNITED STATES PATENT AND TRADEMARK OFFICE
CERTIFICATE OF CORRECTION

PATENT NO. : 3,971,620
DATED : July 27, 1976
INVENTOR(S) : George Everett

It is certified that error appears in the above-identified patent and that said Letters Patent are hereby corrected as shown below:

Column 12, line 2, "spurs" should read --spars--; and

Column 12, line 9, "comprise" should read --comprises--.

Signed and Sealed this

Nineteenth Day of October 1976

[SEAL]

Attest:

RUTH C. MASON
*Attesting Officer*

C. MARSHALL DANN
*Commissioner of Patents and Trademarks*